Aug. 2, 1966  H. K. KRANTZ  3,264,556
PROBE POSITIONING DEVICE FOR USE IN MEASURING
AND CHECKING SEMICONDUCTOR SPECIMENS
Filed Dec. 29, 1961  5 Sheets-Sheet 1

FIG. 1

INVENTOR
H. K. KRANTZ
BY
*C. E. Hirsch Jr.*
ATTORNEY

FIG. 2

INVENTOR
H. K. KRANTZ
BY
ATTORNEY

Aug. 2, 1966 H. K. KRANTZ 3,264,556
PROBE POSITIONING DEVICE FOR USE IN MEASURING
AND CHECKING SEMICONDUCTOR SPECIMENS
Filed Dec. 29, 1961 5 Sheets-Sheet 3

INVENTOR
H. K. KRANTZ
BY G. E. Hirsch Jr.
ATTORNEY

INVENTOR
H. K. KRANTZ
BY
ATTORNEY

INVENTOR
H. K. KRANTZ
BY G. E. Hirsch Jr.
ATTORNEY 3,264,556
PROBE POSITIONING DEVICE FOR USE IN MEASURING AND CHECKING SEMICONDUCTOR SPECIMENS
Hubert K. Krantz, Springfield, N.J., assignor to Bell Telephone Laboratories, Incorporated, New York, N.Y., a corporation of New York
Filed Dec. 29, 1961, Ser. No. 163,137
18 Claims. (Cl. 324—62)

This invention relates to apparatus for use in making measurements and characterizing the electrical and physical qualifications of various materials and, more particularly, to a four-point probe for such purposes.

In the fabrication of semiconductor devices, it is necessary that samples of grown-crystals, for example, be carefully evaluated to determine both their specific properties, and their suitability for use in the manufacture of various solid-state devices. Often the properties of such crystals are measured twice; the first time to insure that the crystal itself meets certain prescribed standards (and concomitantly to insure that the technique used in the crystal growing process is of a high order of efficiency); and a second time to determine whether an approved crystal will yield a semiconductor device with characteristics satisfactory for a prescribed use. For both single and multiple conductivity type materials, measurements of the conductivity type, the resistivity, and the lifetime of minority carriers are usually adequate for specifying the important properties of a given material.

Measurements of sample resistivity impose the most stringent requirements on the mechanical apparatus necessarily involved. Resistivity is normally measured by positioning four probe points in a particular array on a flat surface of a crystal or on a bar or dice made therefrom. A suitable current is then applied to the outer probe points and the resulting floating potential is measured across the inner adjacent probe points. The floating potential is normally measured with a high impedance voltmeter to avoid any errors introduced by the resistance at the metal-semiconductor contact. A potentiometer-type instrument is particularly useful for this purpose because of its high input impedance. If the specimen to be measured is relatively large, that is, has a diameter, or minimum rectangular dimension, of approximately 200 mils, the resistivity for a probe point spacing of 0.05 inch (equal spacing between all points) is given by the equation $\rho = 0.3\ V/I$. Most semiconductor crystal samples measured have resistivities in the range of 0.001 to 10,000 ohm-cm., so that a lower limit on the current to be used is set by the accuracy of the circuitry utilized in measuring small voltages. An upper limit must be placed on the current in order to guard against minority carrier injection into the specimen and to prevent abnormal heating of the sample. If the specimen is small, the equation for measuring resistivity is more complex since specimen boundary effects may no longer be neglected. For such measurements, the adverse effects of the dice boundaries must be compensated for empirically.

In all resistivity measurements, it is essential that the points be sufficiently close to each other to yield an unambiguous measure. In addition, they must be spaced far enough from the boundaries of the specimen that boundary effects do not adversely influence fields established near the points. Accordingly, while probe point spacings in the range of 30 to 50 mils may be tolerated, with respect to available surface area, in measurements of the resistivity of whole or half crystals, much closer probe spacings are necessary for measurements made on a dice. By way of example, a dice suitable for ultra-high frequency applications often has a surface whose nominal diameter (or width) is approximately 25 mils. If the boundaries of such a specimen are not to affect adversely the resistivity measurements, even though boundary conditions are compensated for in the initial design, adjacent probe point spacings of the order of 5 mils may often be required. In addition, it has been found that probe point spacings of the order of 5 mils are equally important if very accurate resistivity data is to be obtained on relatively large specimens, such as at random points along an elongated flat surface of an ingot, for example. It will be appreciated that extreme care must be observed in the design and operation of a mechanical device for such purposes to achieve not only the requisite, accurate spacings and pressures, but also the accurate reproducibility of the probe point array spacings and pressures, respectively.

Unfortunately, prior art instruments utilized for making resistivity measurements and the like do not provide the degree of accuracy, uniformity, and sensitivity, nor an adequate range of probe point spacings and pressures, necessary for analyzing and evaluating with extreme accuracy the properties of specimens. Such instruments of the prior art also do not provide either the degree of stability necessary for obtaining reproducible probe point positioning through precision adjustment of the selective transport mechanisms, or the degree of versatility required in effecting such transport in three mutually perpendicular directions.

Accordingly, a definite need exists for apparatus capable of repeatedly positioning, with precision, probe points in various extremely close spaced arrays on a specimen under examination. To this end, it is important that the probe points be controlled independently of each other with respect to both position and pressure.

In addition, apparatus of the four-point probe type should possess a number of additional features not found in the prior art if laboratory standards of precision and a long trouble-free life are to be realized. These include: (1) low friction pivots for each probe arm, (2) means for equalizing and stabilizing probe point pressures, (3) non-teetering and non-tottering probe arm balance, (4) accommodation of a satisfactory range of work-piece thickness, (5) provision for leveling of the work-piece platform (6) low impact probe point engagement, (7) readily replaceable probe points, (8) easy inspection of probe point wear, and (9) an arrangement which provides a clear indication of work-piece thickness and trueness. The importance of these features will become more apparent in a detailed description of the apparatus hereinbelow.

It is thus an object of this invention to provide an improved instrument capable of making delicate probe point contact in various intricate arrays on a specimen, such as desired in making extremely accurate measurements of the electrical properties of specimens having either large or extremely small surface areas.

It is another object of this invention to increase the degree of accuracy, sensitivity, flexibility, and versatility of a four-point probe and to provide individual adjustment of both probe point spacing and pressure.

It is a further object of this invention to provide precision, low-friction, three-dimensional probe transports.

It is an additional object of this invention to provide a four-point probe for use in measuring either electrical or physical properties of specimens exhibiting a wide range of sizes and shapes with a high degree of accuracy.

It is still a further object of this invention to provide a four-point probe of unique construction conducive to conventional but economical manufacture.

These and other objects of the invention are attained with a unique four-point probe wherein the four-probe arms are pivotally mounted on four saddles, respectively, with each saddle supported on a frame which is capable of being microscopically adjusted in orthogonal directions. A work-piece platform is rigidly secured to a support base and coarsely and microscopically adjustable in height for accommodating a wide range of specimens or work-piece thicknesses. A pair of pivotal yokes associated with a common gear driven shaft are utilized to raise and lower the probe arms simultaneously through the action of a single control knob.

In accordance with an aspect of the invention a pair of hardened steel pins are uniquely employed to pivot the probe arms on their respective saddles. This arrangement advantageously provides low-friction pivoting which minimizes the danger of adverse probe point pressure fluctuations either damaging a specimen or resulting in erroneous measurements being obtained. Such probe arm support also contributes to the realization of a very high impedance path between the mutually adjacent probe points, which is also important if extremely accurate resistivity measurements are to be obtained.

In accordance with another aspect of the invention, substantially orthogonal movement of each probe point is effected by pairs of precision screws associated with support pins affixed in the respective saddles. Conical screw tips act as wedges to deflect the saddle support pins and thereby to move the saddles in a precise and uniform manner. Each pair also serves as a locking device when the desired position of the probe point has been obtained. An adjustable precision screw is also associated with the under surface of each probe arm to provide individual movement thereof in the vertical or Z direction. These screws also advantageously insure that the probe arms never drop below a given reference plane which could adversely affect the probe point spacings. This eliminates the errors that might otherwise occur in making measurements on specimens having irregular surfaces or thin spots.

In accordance with an additional aspect of the invention, warning means are employed to indicate to an operator if a given specimen has a thickness of surface region which is too large to prevent the probe arms from lying along a given reference plane as is required if the probe point spacings are to remain fixed.

In accordance with another aspect of the invention, an adjustable counter-balancing weight incorporated in each probe arm allows probe point pressure variations, ranging from 0 to 60 grams, for example, to be obtained. Also incorporated in each probe arm is a pressure scale which provides a continuous visual indication of the pressure exerted by each probe point on the specimen. Such built-in scales also facilitate the adjustment of probe point pressures uniformly as may be required in the analysis of properties of a number of different specimens.

In accordance with still another aspect of the invention, the probe points are mounted on the tapered ends of non-conducting plates. These plates are in turn affixed to the respective probe arms on surfaces angularly oriented toward a common central region. This arrangement allows in-line probe point spacings on the order of 5 mils to be realized without undue difficulty. Such an orientation of probe points also minimizes deleterious capacitance effects which could otherwise adversely affect any electrical measurement results.

These and other objects, the nature of the present invention, and its various features and advantages will appear more fully upon consideration of the specific illustrative embodiment shown in the accompanying drawings and the following detailed description of the drawings.

The apparatus is described hereinafter with specific relation to one preferred application, i.e., to the measurement of the resistivity of specimens of either large or small dimensions. It is to be understood, however, that the invention has particular utility in any application where probe points must be placed on a specimen at a precise location and with precise pressure in order to make an analytical determination of its electrical or physical characteristics or properties.

Figure 1:
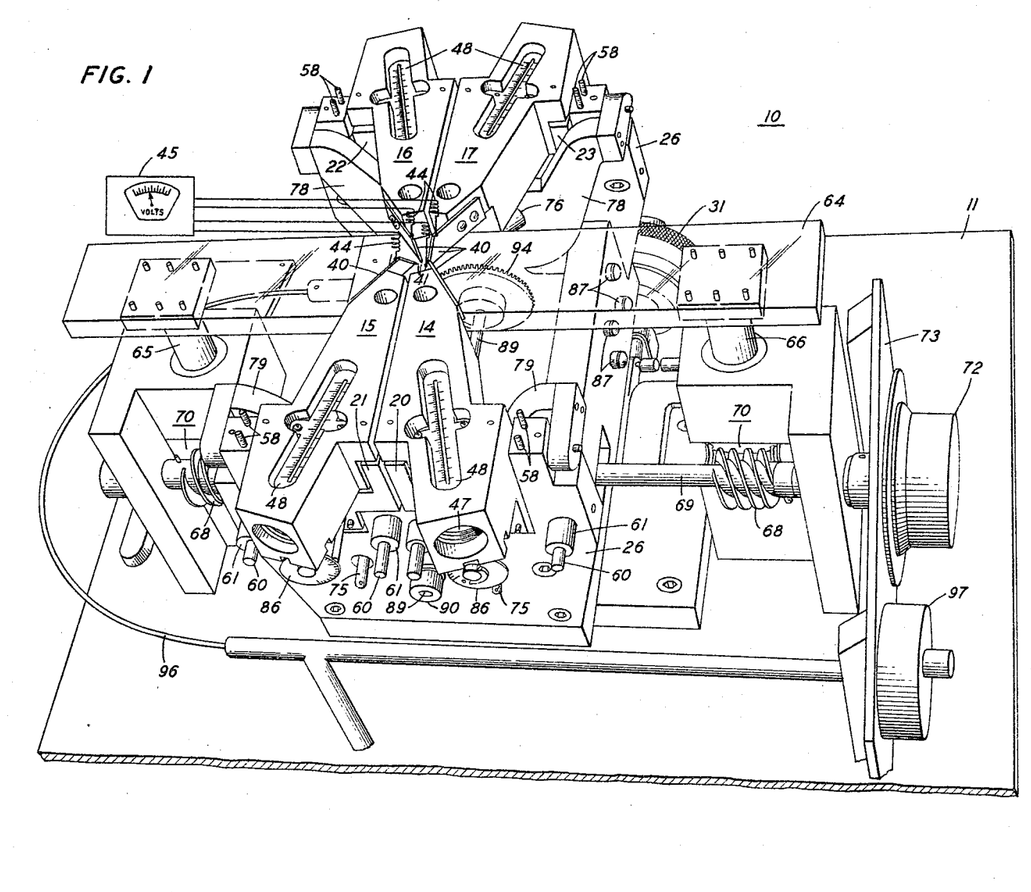
FIG. 1 is an isometric view of a four-point probe embodying principles of this invention.

Considering the drawing more particularly, FIG. 1 depicts, in isometric form, a four-point probe 10, often referred to hereinafter by the terms, instrument or apparatus, supported on a rigid, stationary base 11. Four probe arms, 14 through 17, are pivotally mounted on four saddles 20 through 23, respectively; and each saddle is supported on a common frame 26 associated with the base 11. The frame 26 may be either rigidly secured to the base 11 or mounted on a suitable commercially available micro-positioner 28 as shown best in FIG. 2. The positioner rests upon a stationary platform 29 mounted on the base 11 and comprises a first movable platform 30 adjustable in the Y direction (perpendicular to the plane of FIG. 2) by means of a micrometer mechanism 31. A second movable platform 34 is adjustable in the X direction (left-right in FIG. 2) by means of a micrometer mechanism 35. Such as arrangement enables a pre-adjusted probe point array supported on the frame 26 to be brought into contact with the specimen at microscopically determinable locations in both the X and Y directions.

Figure 4A:
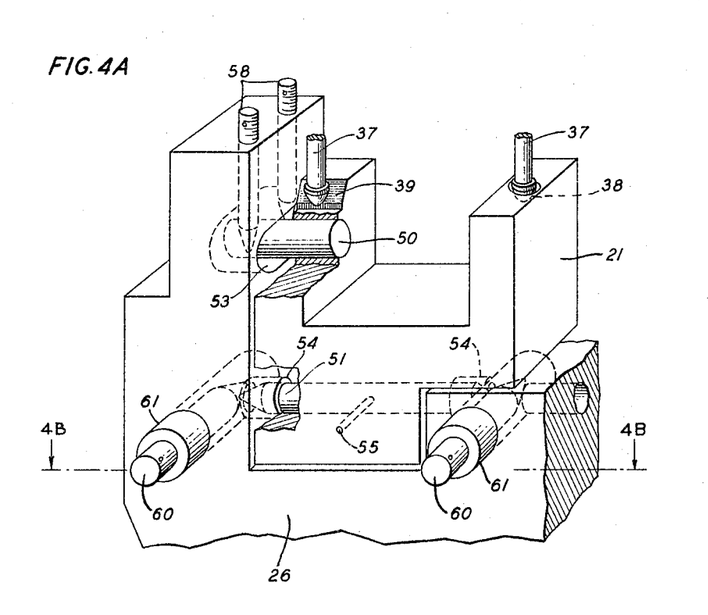
FIG. 4A is an isometric view aiding in an understanding of the three-dimensional transport of certain fixtures included in the apparatus of FIG. 1.
Figure 5:
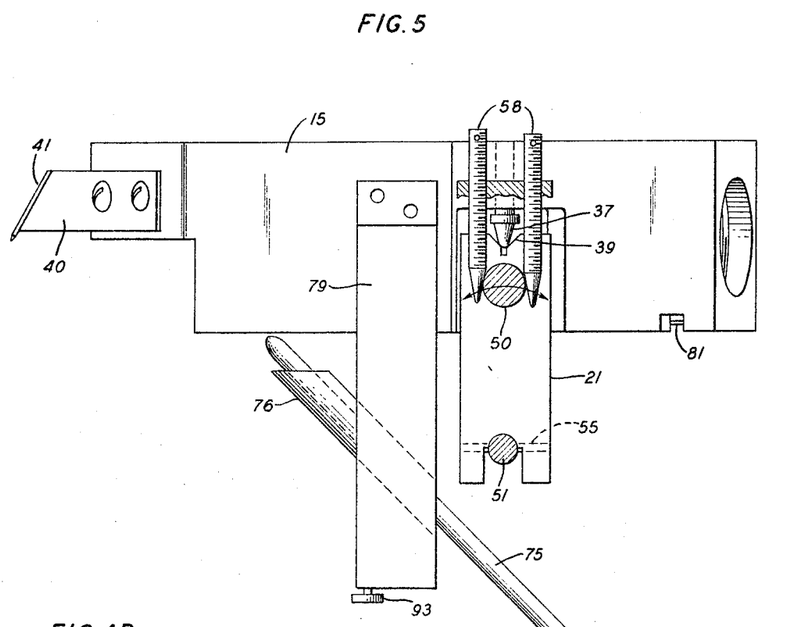
FIG. 5 is a cross-section of certain other movable fixtures of the apparatus depicted in FIG. 1.

In accordance with an aspect of the invention, each probe arm is provided with a pair of hardened steel pins 37, shown in FIGS. 4A and 5, that extend through the probe arm and protrude a short distance therebelow. The lower ends of the pins 37 are rounded and are accommodated respectively by a hemispherical dimple 38 and a V-shaped groove 39 in the upper surfaces of the particular one of saddles 20 through 23 contiguous thereto. Each saddle thus provides the fulcrum about which the associated probe arm pivots. This form of probe arm support assures very low friction pivoting about each saddle. The manner in which the probe arms are supported also contributes to the attainment of an extremely high resistance path, of the order of 100,000 megohms, between the mutually adjacent probe point ends. This is very important if extremely accurate and reliable resistivity measurements are to obtained over a wide range, such as with a sensitive bridge circuit, for example.

As depicted in FIGS. 1, 3A, 3B, and 5, the ends of each probe arm has affixed thereto a non-conducting plate 40 with an appropriately small conductive probe point 41 of tungsten, osmium, or of other hard and high wear resistant material, secured thereto. The plates 40 may be of any suitable material, such as aluminum oxide, and are appropriately angled toward each other to permit the ends of the probe points in contact with the specimen to be adjusted to within 5 mils of each other in a linear array. This arrangement also minimizes adverse capacitance effects between the adjacent probe points. The points are preferably mounted on tapered ends of the plates 40 with suitable solder or adhesive bonding of any sort well known in the art. This has been found to provide adequate rigidity while still allowing each probe point to be readily replaced as an individual item or together with its associated mounting plate. Wire wound springs 44 (visible in FIG. 1), preferably having a high degree of elasticity and exhibiting low deflection forces, provide flexible electrical connections between the probe points and the terminal electrodes of a resistivity measuring circuit 45. The terminal electrodes are normally secured to a suitable receptacle, which may include an amplifier, mounted on a housing for the apparatus, not shown. For simplicity, the flexible connections have been shown as connected directly to the auxiliary measuring apparatus 45. This apparatus is capable of supplying the necessary current to the outer pair of probe points and of measuring and visually indicating the floating potential across the inner pair of points as normally required in making resistivity measurements.

Figure 2:
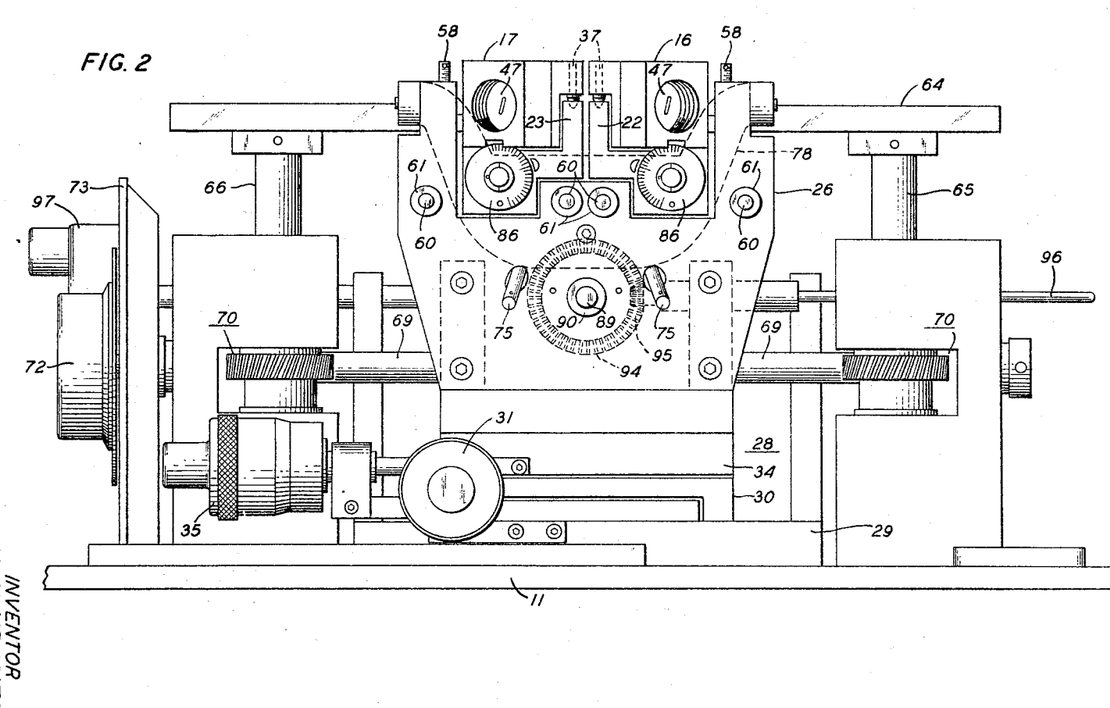
FIG. 2 is a plan view of one side of the four-point probe of FIG. 1.

Each probe arm has a cylindrical counter-balancing weight 47 associated with it, as seen best in FIG. 2. The respective weights may be adjusted to provide individual probe point pressures on the specimen ranging from 0 to 60 grams, for example, by screwing each weight into a threaded cavity of the associated probe arm to the desired position. Such control of individual probe point pressure allows resistivity measurements and the like to be made on an extremely thin and fragile specimen without danger of cracking it or of cutting too deeply into its surface. A pressure scale 48 is incorporated in each probe arm to provide a convenient visual indication of the pressure exerted by each probe point on a specimen. This also facilitates making a balanced adjustment of probe point pressure, usually required in analyzing the properties or characteristics of specimens.

Figure 4B:
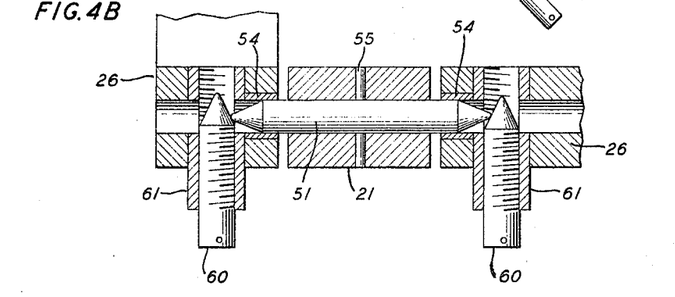
FIG. 4B is a cross-section of certain fixtures used for effecting the lateral movement of fixtures depicted in FIG. 4A taken along the line 4B—4B.

Precise, orthogonal positioning and locking of the probe arms (and with them the probe points) is effected in the following manner. Referring to FIGS. 4A, 4B, and 5, each of saddles 20 through 23 (only saddle 21 being shown in these figures) is mounted in spaced relationship with respect to L-shaped sections of the fixed frame 26 by two support pins 50 and 51. As best seen in FIG. 4A, the one end of support pin 50 extends into an oversized clearance hole 53 in the frame 26. The ends of support pin 51 extend bearings 54 in the frame 26 and allow axial movement of the support pin 51. This pin is affixed to saddle 21 by a fastening pin 55. A pair of precision screws 58, having conical ends, are threaded into the top surface of the frame 26 on opposite sides of support pin 50 and act as wedges to deflect this pin, the particular one of saddles 20 through 23, and thereby the probe arms 14 through 17, respectively associated therewith, to the left or right as viewed in FIG. 5. More specifically, with reference to the fixtures depicted in FIGS. 4A and 4B, by withdrawing one of the screws 58 and advancing the other, the pin 50 associated therewith is displaced, thus pivoting the saddle 21 about the axis of the lower pin 51 and thereby moving with precision the probe arm 15 (not shown) forward or backward with respect to the frame 26. Screws 58 also provide locking of the saddle and thereby of the associated probe arm and probe point in the desired position. The screws 58 and the angle of their conical ends are preferably so chosen as to provide a convenient increment of displacement of the support pin 50 per turn or fractional turn of the screws 58.

Similarly, a pair of precision screws 60 having conical ends, are threaded into bushings 61 protruding out of bores in the exterior side walls of the frame 26 on opposite sides of each saddle and perpendicular to the support pin 51 associated therewith, respectively. As most clearly seen in FIG. 4B, the ends of support pin 51 are also conical. With reference to the fixtures depicted in FIGS. 4A and 4B, the withdrawal of one of the screws 60 and the advancement of the other, axially displaces the support pin 51 associated therewith. This causes the saddle 21 (through its pin 55) and the probe arm 15 supported thereon to move sideways. Threads on screws 58 and 60 may be cut to provide an axial displacement of support pins 50 and 51 of, for example, 0.001 inch for each 90 degrees of rotation. This permits very accurate and known movement of the probe arms through extremely small distances with precision control. The screws 60 also firmly fix and hold the support pin 51 in its adjusted or displaced position.

By way of example, a four point probe embodying this form of transport provides an in-line probe point array having adjacent point spacings ranging from 5 to 60 mils. A rectangular array is possible having spacings in the Y direction ranging from approximately 1 mil to 60 mils and spacings in the X direction ranging from 5 to 180 mils. Such a wide range of selective probe point spacings coupled with the approximately one-half inch X–Y transport of the entire array by the micro-manipulator, provides a degree of versatility and flexibility not found possible with any prior known four point probe assemblies.

A work-piece elevator platform 64 (seen in FIGS. 1 and 2), preferably made of translucent insulating material, such as glass, is supported beneath the probe points by means of two support members 65 and 66 affixed to the stationary base 11. Members 65 and 66 are adjusted through the action of two worms 68 on a shaft 69, which mesh with corresponding worm gear assemblies 70 attached to support members 65, 66. With one end of the shaft 69 connected to a manually operable control knob 72 on the front face plate 73 of the probe assembly, the elevation of the platform relative to the position of the probe points may be accurately and readily controlled.

Figure 6:
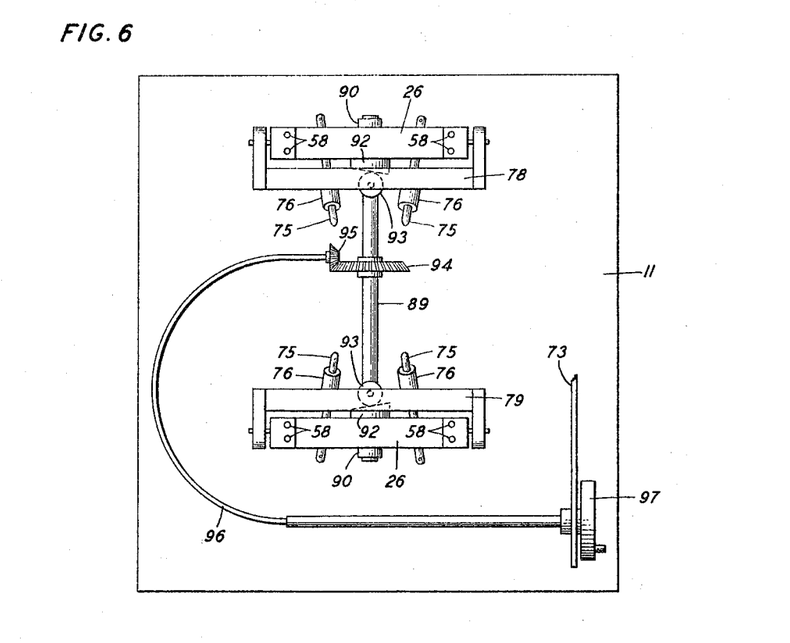
FIG. 6 is a plan top view of certain fixtures of the apparatus depicted in FIGURE 1.

A pair of inclined adjustment screws 75, best seen in FIGS. 2, 5, and 6, are respectively threaded into bushings 76 in each of two yokes 78, 79 and extend through the vertical surfaces thereof for a short distance in regions beneath the under surfaces of the respective probe arms. The extended portion of one screw 75 is best seen beneath the probe arm 15 in FIG. 5. The opposite ends of the screws extend downwardly and outwardly through oversized apertures in the frame 26 to facilitate their rotation. These screws provide precise, individual adjustment of the respective probe arms in the Z or vertical direction. Concomitantly, they determine the fixed angle, if any, with respect to the horizontal at which each probe arm is supported.

It is quite apparent that when probe point spacings of the order of 5 mils are sought, the slightest vertical movement of the probe arms from a common, pre-adjusted horizontal co-planar position will cause the respective mutually opposed pairs of probe points to move away from each other.

Accordingly, in accordance with another feature of the invention, an alarm system is provided to warn an operator if a particular specimen under examination has a thickness dimension which is too large to permit the probe arms to lie in a single horizontal plane. The alarm system comprises an electrical circuit associated with each probe arm including a flexible spring 81 (seen in FIG. 3B) mounted in a slot on the bottom surface of each probe arm. The spring is biased at one end against a rigid metal plate 83 and at the other end against a pin 84 and beneath a large head thereof. Four eccentric gears or cams 86 (seen in FIG. 2) are mounted on insulating shafts affixed to the exterior surfaces of the frame 26 directly beneath the respective probe arms and contiguous to the springs 81 associated therewith. Four warning lights 87 (seen in FIG. 1) are mounted on the frame 26 in a visible region beneath the translucent work piece platform and associated respectively with the four probe arms. Neither the electrical connection between each eccentric cam 86 and the light associated therewith nor the voltage source for lighting the warning lights is shown.

Figure 3A:
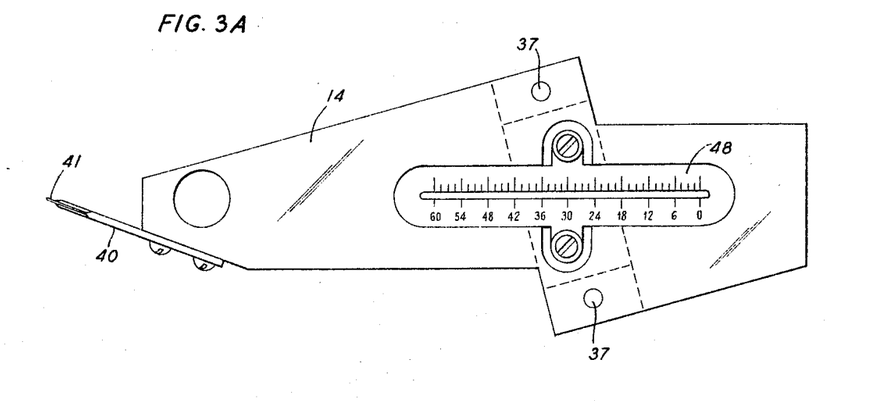
FIGS. 3A and 3B are detail top and bottom plan views of fixtures of the apparatus depicted in FIG. 1.
Figure 3B:
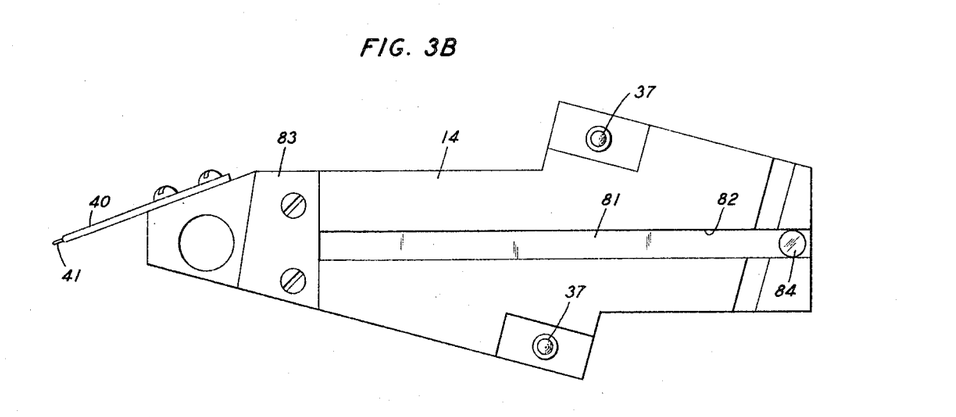

The alarm system is utilized in the following manner. The probe arms 14 through 17 are initially adjusted in the vertical direction to insure horizontal, co-planar alignment of the four adjacent probe points. The precision Z adjustment screws are then rotated to bear against the rigid metal plates 83 affixed to the respective under surfaces of the probe arms as seen in FIG. 3B. This insures that the probe arms cannot be lowered below the pre-adjusted horizontal, co-planar position. The eccentric cams 86 are then rotated such that they merely touch the springs 81 of the probe arms respectively associated herewith. Thereafter, the work piece platform is lowered by control knob 72 on the face plate 73 to position a specimen of known thickness below the probe points. The platform is then raised to an elevation corresponding to the thickness of the specimen as indicated by a suitably marked Vernier scale on the control knob 72. Thereafter, if the specimen should have a region of greater thickness than initially measured, one or more of the eccentric cams 86 will make contact with the associated springs 81 and thereby close the particular electrical circuit or circuits to the appropriate warning lights. Conversely, if a region of the specimen has a thickness dimension less than the initially measured value, the particular probe point located in such a region will be unable to make electrical contact with the specimen because of the precision screw 75 biased against the under surface of the probe arm associated with the probe point in question and hence, there will be no electrical circuit from the probe point to the measuring instrument 45. With such an indicating arrangement, extremely precise and reproducible probe point spacings are obtained. This, in turn, makes possible the realization of continuous and uniform measurements of resistivity and the like with a high degree of accuracy.

As best seen in FIGS. 1 and 6, the four probe arms are raised and lowered from the platform 64 by means of a pair of yokes 78 and 79 pivotally secured to opposite sides of the frame 26. With reference to FIG. 6, the yokes 78 and 79 are pivoted inwardly from a vertical position to raise the probe arms, simultatneously, by means of a rotatable shaft 89 mounted in bearings 90 in the fixed frame 26 at each end and having two eccentric face cams 92 affixed to the shaft in the respective regions beneath each yoke. The inner surface of each cam 92 bears against a concentric rotatable disc or wheel 93 mounted on a shaft beneath the under surface of each yoke. The eccentric face cams 92 are thus in a plane perpendicular to the wheels 93. A bevel gear 94 affixed to the rotatable shaft 89 is in mutual engagement with a bevel gear 95 affixed to one end of a flexible shaft 96. A control knob 97 is connected to the other end of the flexible shaft at the front face plate 73 of the apparatus. Accordingly, by rotating the control knob 97, the eccentric face cams 92 bear against the concentric wheels 93 affixed to the under surfaces of the respective yokes and cause them to pivot toward or away from each other. When the yokes are pivoted toward each other, for example, the inclined rods 85 bear against the metal plate 83 (seen in FIG. 3B) respectively affixed to the under surfaces of the probe arms. This, in turn, pivots the probe arms upwardly or away from the work piece platform. With such a gear train arrangement, the vertical position of the probe points relative to the specimen to be analyzed may be controlled without impact as a gear reduction ratio may be employed, for example, where two complete turns of the control knob 97 lowers the probe points a distance of the order of only 1 mil.

Other refinements may, of course, be omitted or added depending upon the requirements and uses of the apparatus as, for example, for such as laboratory, pilot-lot or mass production usages. One modification, for example, could involve a suitable cam arrangement whereby the entire probe arm assembly riding on the frame would be pushed back or displaced laterally relative to the platform 64 by the final knob movement of raising the probe points from the specimen. This would better expose and facilitate positioning of the specimen. Additionally, suitable positioning elements could be added to the platform 64 to facilitate locating particularly shaped specimens under the probe points.

It is therefore to be understood that the specific embodiment described herein is merely illustrative of the general principles of the instant invention. Numerous other structural arrangements and modifications may be devised in the light of this disclosure by those skilled in the art without departing from the spirit and scope of this invention.

What is claimed is:

1. An apparatus for use in making resistivity measurements and the like on specimens of various materials comprising a stationary base, a first supporting frame mounted on said base, at least one pair of saddles pivotally mounted on said frame, a probe arm pivotally mounted on each of said respective saddles, means to adjust the angular position of said saddles and said probe arms about their respective pivotal mountings, means to linearly translate said saddles along the axes of their pivotal mountings, means affixed to the ends of said probe arms for mounting probe points thereon, respectively, means included in each of said probe arms for varying the pressure exerted by the probe points thereof on a specimen, means included in each of said probe arms for indicating said pressure, an adjustable work-piece platform supported on said base and positioned beneath said probe points, and adjustable yoke means pivotally secured to said frame, said yoke means carrying said means to adjust the angular position of said probe arms, and cam means operative against said yoke means to disengage said probe points from said specimens.

2. Apparatus in accordance with claim 1 wherein said means for varying the pressure exerted by each probe arm comprises a counter-balancing weight positioned in the end of each probe arm.

3. A four-point probe for use in making resistivity measurements and the like on specimens of various materials comprising a stationary base, a supporting frame mounted on said base, two pairs of mutually opposed saddles pivotally mounted on opposite sides of said frame, four probe arms, each pivotally mounted on a different one of said saddles, means affixed to the ends of said probe arms respectively for mounting probe points thereon, means coupled to said frame for moving said saddles independently of each other linearly along the axes of said pivotal mountings of said saddles, and means mounted in said frame to rotate said saddles about the axes of said pivotal mountings of said saddles, means incorporated in each of said probe arms for varying the pressure exerted by said probe point on a specimen, means incorporated in each of said probe arms for indicating said pressure, an adjustable work-piece platform mounted at opposite ends on said base and extending beneath the mutually adjacent ends of said probe arms, adjustable yoke means pivotally secured to said frame for raising and lowering the ends of said probe arms, and means for applying current to at least two of said probe points and including means for measuring a floating potential across at least two other probe points when said points are positioned on a specimen supported on said platform.

4. A four-point probe in accordance with claim 3 wherein said saddles are pivotally mounted on said frame, said pivotal mounting comprising a supporting spindle rigidly affixed to each of said saddles and mounted in bearings in said frame, a locating pin rigidly affixed to each of said saddles and having its axis parallel to the axis of said spindle, and wherein said means to linearly move and rotate each of said saddles comprises first and second pairs of precision screws having conical ends threaded in said frame and respectively contiguous to said locating pin, the screws of each of said pairs when rotated in opposite directions moving the spindle parallel to its axis and the locating pin perpendicular to its axis and about the axis of said spindle.

5. A four-point probe in accordance with claim 3 wherein each of said probe arms is pivotally mounted on a different saddle by a pair of steel pins extending through said saddle and for a short distance beneath the underside thereof, the lower ends of said pins being rounded and accommodated by a hemispherical dimple and a V-shaped groove, respectively, in upper surface areas of the saddle on which said probe arm rests.

6. An instrument for use in measuring and characterizing the electrical and physical qualifications of specimens of various materials comprising a stationary base, a supporting frame mounted on said base, four saddles independently and pivotally mounted on said frame, four probe arms each having a probe point affixed to mutually adjacent ends thereof and each independently and pivotally mounted on one of said saddles, respectively, said probe arms being positioned to have said probe points lie within a small preselected area between the probe arms, the individual probe points each being at an acute angle to the horizontal plane of the specimen, and the angle between any two adjacent probe arms being at least 45 degrees and not greater than 135 degrees, means incorporated in each of said probe arms for both varying and indicating the pressure exerted by the points thereof on a specimen, an adjustable work-piece platform supported on said base and positioned beneath said probe points, and means providing transport of the mutually adjacent ends of said probe arms in three approximately mutually perpendicular directions.

7. In combination, a supporting base, a frame having portions extending vertically to said base and supporting at least two saddles pivotally mounted on vertically extending portions of said frame, a different probe arm pivotally mounted on each of said saddles, said probe arms being oriented to have mutually adjacent ends, means for mounting probe points on the mutually adjacent ends of said probe arms respectively, means to move each of said probe arms independently in mutually perpendicular planes, an adjustable work-piece platform supported on said supporting base and positioned beneath said probe points, adjustable yoke means pivotally secured to said frame for raising and lowering the probe point ends of said arms relative to said work-piece platform, and balance means included in each of said probe arms for varying and indicating the pressure exerted by the probe point ends thereof on a specimen.

8. Apparatus in accordance with claim 7 further comprising means for indicating whether a given specimen has a thickness dimension too large to permit said probe arms to lie along a single predetermined horizontal plane when the probe points of said arms are placed upon said specimen.

9. Apparatus for precisely positioning and impressing minute probe points on a surface of a specimen with independent control of both the position and pressure of each probe point comprising a stationary base, a supporting frame mounted on said base, a first pair of saddles pivotally mounted on one side of said frame, a second pair of saddles pivotally mounted on the other side of said frame, a different probe arm pivotally mounted on each of said saddles, means for mounting a probe point on the end of each probe arm and at an angle extending downwardly, means connected to said frame to move each of said saddles independently of each other linearly along and rotationally about the axis of its pivotal mounting, means to independently rotate each of said probe arms around the axis of its pivotal mounting and an adjustable work-piece platform supported on said stationary base and positioned beneath said probe points.

10. Apparatus in accordance with claim 9 further including balance means included in each of said probe arms for varying the pressure exerted by the probe point ends thereof on a specimen and also including means included in each of said probe arms for indicating said pressure.

11. Apparatus in accordance with claim 9 wherein said means to rotate said probe arm includes an adjustable yoke means pivotally secured to said frame for raising and lowering the mutually adjacent ends of said probe arms relative to said work-piece simultaneously.

12. A probe positioning device comprising a rigid probe arm having affixed thereto an electrode, a saddle pivotally supporting said proble arm for rotation in only one plane, a frame pivotally supporting said saddle, a first axle rigidly secured to said saddle, a first adjustment means to linearly translate said saddle along the axis of said first axle, a second adjustment means to rotate said saddle about said axis of said first axle, and a third adjustment means to rotate said probe arm about its pivotal support, said third adjustment means comprising a yoke arm affixed to a second axle positioned in said frame, said yoke arm including means to adjust the angular position of said probe arm with respect to said yoke, and cam means to adjust the angular position of said yoke arm with respect to said frame.

13. A probe positioning device according to claim 12 wherein the ends of said first axle are conical in cross section, and said first adjustment means comprises a pair of adjustment screws threaded in said frame and each having one conical end, said adjustment screws being positioned in said frame so that said conical ends of said adjustment screws bear against opposite conical ends of said first axle.

14. A probe positioning device according to claim 12 wherein said second adjustment means comprises a rigid locating pin affixed to said saddle and a pair of adjustment screws threaded to said frame and having conical ends, said conical ends bearing against opposite sides of said locating pin.

15. A probe positioning device in accordance with claim 12 wherein said probe arm includes a counterbalancing weight and means to measure the balance.

16. An apparatus for use in making resistivity measurements and the like on specimens of various materials comprising a stationary base, means mounted on said stationary base to hold and locate said specimens, a plurality of rigid probe arms, each having affixed to it a probe point, means to independently position each of said probe arms, said means to position comprising a saddle having a probe arm pivotally mounted thereon, a frame having a first axle means to support said saddle affixed to said first axle, a first adjustment means to linearly translate said saddle along the axis of said first axle, a second adjustment means to rotate said saddle around said first axle, a third adjustment means to rotate said probe arm around said pivotal mounting, said third adjustment means comprising a yoke arm affixed to a second axle, said yoke arm including means to adjust the angular position of said probe arm and cam means to alter the angular position of said yoke arm.

17. An apparatus for use in measuring and characterizing the electrical and physical qualification of specimens of various material including a four point probe positioning device having a stationary base, a supporting frame mounted on said base, two pairs of saddles mounted on opposite sides of said frame, each of said saddle mountings comprising four first axles positioned in said frame, each of said saddles being affixed to one of said first axles, a first adjustment means to move each saddle independently along the axis of its axle, a second adjustment means to rotate each saddle independently about its axle, four probe arms each pivotally mounted on a different one of said saddles, a third adjustment means to independently rotate each of said probe arms about said pivotal mounting, said third adjustment means comprising two mutually opposing yoke arms being affixed to two second axles positioned in said frame, each of said yoke arms including means to adjust the angular position of each of said probe arms about their respective pivotal mountings, and cam means to adjust the angular position of each of said yoke arms with respect to said frame.

18. In combination, a supporting base, a frame having portions extending vertically to said base and supporting at least two saddles pivotally mounted on vertically extending portions of said frame, a different probe arm pivotally mounted on each of said saddles, said probe arms being oriented to have mutually adjacent ends, means for mounting probe points on the mutually adjacent ends on said probe arms, respectively, means to move each of said probe arms independently in mutually perpendicular planes, said means to move each of said probe arms respectively comprising two pairs of precision screws threaded into said frame and having conical ends, a first pair of said screws being positioned at opposite ends of and perpendicular to a first support rod having conical ends extending through the saddle affixed thereto and into bearings in said frame, said first pair of precision screws moving said saddle affixed to said first support rod in a direction axially thereof when one of said screws of said first pair is advanced and the other is withdrawn, said second pair of precision screws being positioned on opposite sides of a second support rod rigidly affixed to a saddle at one end and extending into a clearance hole in said frame intermediate said second pair of precision screws at the other end, said second support rod pivoting said saddle and probe arm about said first support rod when one of said screws of said second pair is advanced and the other is withdrawn, an adjustable work-piece platform supported on said supporting base and positioned beneath said probe points, and adjustable yoke means pivotally secured to said frame for raising and lowering the probe point ends of said arms relative to said work-piece platform.

References Cited by the Examiner

UNITED STATES PATENTS

| | | | |
|---|---|---|---|
| 2,748,235 | 5/1956 | Wallace | 324—158 |
| 3,048,776 | 8/1962 | Logan | 324—64 |
| 3,134,942 | 5/1964 | Rhodes | 324—158 X |
| 3,167,317 | 1/1965 | Wilson | 274—23 |
| 3,170,114 | 2/1965 | Placke | 324—37 |
| 3,185,927 | 5/1965 | Margulis | 324—158 |

WALTER L. CARLSON, *Primary Examiner.*

G. S. KINDNESS, E. L. STOLARUN
*Assistant Examiners.*